(12) United States Patent
Birdal et al.

(10) Patent No.: US 8,629,883 B2
(45) Date of Patent: Jan. 14, 2014

(54) METHOD AND SYSTEM FOR GENERATING ONLINE CARTOON OUTPUTS

(75) Inventors: Tolga Birdal, Izmir (TR); Mehmet Ozkanoglu, Istanbul (TR); Abdi Tekin Tatar, Istanbul (TR)

(73) Assignee: Befun Bilgi Teknologileri A.S., Istanbul (TR)

( * ) Notice: Subject to any disclaimer, the term of this patent is extended or adjusted under 35 U.S.C. 154(b) by 642 days.

(21) Appl. No.: 12/371,243

(22) Filed: Feb. 13, 2009

(65) Prior Publication Data

US 2009/0219298 A1 Sep. 3, 2009

Related U.S. Application Data

(60) Provisional application No. 61/032,398, filed on Feb. 28, 2008.

(51) Int. Cl.
| | |
|---|---|
| *G09G 5/02* | (2006.01) |
| *G09G 5/00* | (2006.01) |
| *G06K 9/00* | (2006.01) |
| *G06K 9/34* | (2006.01) |
| *G06K 9/40* | (2006.01) |
| *G06K 9/36* | (2006.01) |
| *H04N 5/46* | (2006.01) |
| *H04N 5/445* | (2011.01) |
| *H04N 9/64* | (2006.01) |
| *H04N 9/78* | (2006.01) |
| *H04N 1/46* | (2006.01) |
| *H04N 1/40* | (2006.01) |
| *H04N 1/387* | (2006.01) |
| *G06F 15/16* | (2006.01) |
| *G03F 3/08* | (2006.01) |

(52) U.S. Cl.
USPC ......... 345/593; 345/619; 345/630; 382/164; 382/166; 382/171; 382/251; 382/254; 382/263; 382/276; 348/557; 348/563; 348/576; 348/668; 709/203; 709/218; 709/219; 358/515; 358/518; 358/538; 358/448; 358/450

(58) Field of Classification Search
USPC ......... 345/473, 589, 593, 594, 600, 581, 601, 345/606, 618, 619, 629, 630, 635, 636, 643, 345/645, 646, 674, 530, 548–549, 690; 382/118, 163, 260, 263, 264, 266, 382/164–173, 181, 232, 246, 251, 253, 254, 382/276, 282, 284, 295, 300, 305; 348/552, 348/557, 560, 563–565, 576–578, 599, 630, 348/631, 663, 668, 671; 709/201, 203, 213, 709/217–219, 552, 557, 560, 563–565, 709/576–578, 599, 630, 631, 663, 668, 709/671; 358/512, 515, 516, 518–520, 525, 358/537, 538, 540, 447, 448, 450, 452, 453, 358/201, 203, 213, 217–219

See application file for complete search history.

(56) References Cited

U.S. PATENT DOCUMENTS 5,966,454 A 10/1999 Thomas et al.
6,184,926 B1 * 2/2001 Khosravi et al. ............... 348/239
(Continued)

OTHER PUBLICATIONS

Fang Wen , Qing Luan , Lin Liang , Ying-Qing Xu , Heung-Yeung Shum, "Color sketch generation", Proceedings of the 4th international symposium on Non-photorealistic animation and rendering, Jun. 5-7, 2006, Annecy, France, pp. 47-54.*

(Continued)

*Primary Examiner* — Wesner Sajous
*Assistant Examiner* — Andrew Shin
(74) *Attorney, Agent, or Firm* — Perkins Coie LLP

(57) ABSTRACT

A method and system for generating a cartoon are provided. The method includes receiving a digital image for processing at a server. The method includes executing a color structure coding procedure to produce a color-reduced interim image. The method includes generating a sketch from the digital image with a Difference of Gaussian procedure. The method includes combining the color-reduced interim image and the sketch into a processed cartoon.

28 Claims, 10 Drawing Sheets

(56) References Cited

U.S. PATENT DOCUMENTS

| | | | |
|---|---|---|---|
| 6,226,015 B1* | 5/2001 | Danneels et al. | 345/473 |
| 6,545,682 B1* | 4/2003 | Ventrella et al. | 345/473 |
| 6,763,515 B1 | 7/2004 | Vazquez et al. | |
| 6,804,418 B1* | 10/2004 | Yu et al. | 382/299 |
| 2003/0028543 A1 | 2/2003 | Dusberger | |
| 2004/0136570 A1* | 7/2004 | Ullman et al. | 382/114 |
| 2005/0135701 A1* | 6/2005 | Atkins | 382/274 |
| 2006/0072844 A1* | 4/2006 | Wang et al. | 382/254 |
| 2006/0082579 A1* | 4/2006 | Yao | 345/473 |
| 2008/0075381 A1* | 3/2008 | Ishimaru | 382/266 |
| 2008/0200191 A1* | 8/2008 | Rao et al. | 455/466 |
| 2008/0225045 A1 | 9/2008 | Birtwistle et al. | |
| 2008/0284791 A1* | 11/2008 | Bressan et al. | 345/589 |
| 2009/0087035 A1* | 4/2009 | Wen et al. | 382/118 |

OTHER PUBLICATIONS

Decarlo, D. et al.; "Stylization and Abstraction of Photographs" Siggraph 2002; vol. 21, No. 3, Jul. 31, 2002; pp. 769-776; XP-002471019.

International Search Report PCT/IB2009/005372 dated Oct. 2, 2009; pp. 1-4.

Priese, L.; et al., "Introduction to the Color Structure Code and its Implementation" Apr. 24, 2003; pp. 1-20; URL:http://www.uni-koblenz.de/[1b/1b_down]loads/download/csc.pdf>.

Rosenfeld, A. et al.; "Digital Picture Processing"; vol. 2 (pp. 240-251); Jan. 1, 1982; Academic Press Inc; San Diego, USA, XP002546166.

Sonka, M. et al.; "Image Processing Analysis and Machine Vision"; pp. 77-79; Jan. 1, 1999; Brooks/Cole Publishing Company; Pacific Grove; USA; XP002546167.

Weickert, J. et al.; "Coherence-Enhancing Diffusion Filtering"; International Journal of Computer Vision; Kluwer Academic Publishers; Norwell; USA; vol. 31; No. 2/03; Apr. 1, 1999; pp. 111-127; XP000832599.

Winnemoller, et al.; "Real-Time Video Abstraction"; ACM Transaction on Graphics (TOG) Jan. 31, 2006; vol. 25; No. 3; pp. 1221-1226; New York, USA; XP040042258.

Written Opinion PCT/IB2009/005372 dated Oct. 2, 2009; pp. 1-13.

Co-pending U.S. Appl. No. 12/396,369 by Birdal, T., et al., filed Mar. 2, 2009.

Non-Final Office Action mailed Mar. 16, 2012, in Co-pending U.S. Appl. No. 12/396,369 by Birdal, T., et al., filed Mar. 2, 2009.

Final Office Action mailed Oct. 5, 2012, in Co-pending U.S. Appl. No. 12/396,369 by Birdal, T., et al., filed Mar. 2, 2009.

Advisory Action mailed Dec. 19, 2012, in Co-pending U.S. Appl. No. 12/396,369 by Birdal, T., et al., filed Mar. 2, 2009.

"Tab (GUI)" Wikipedia, Wikimedia Foundation, Mar. 13, 2013, Web http://en.wikipedia.org/wiki/Tab_(GUI) 8 pages.

* cited by examiner

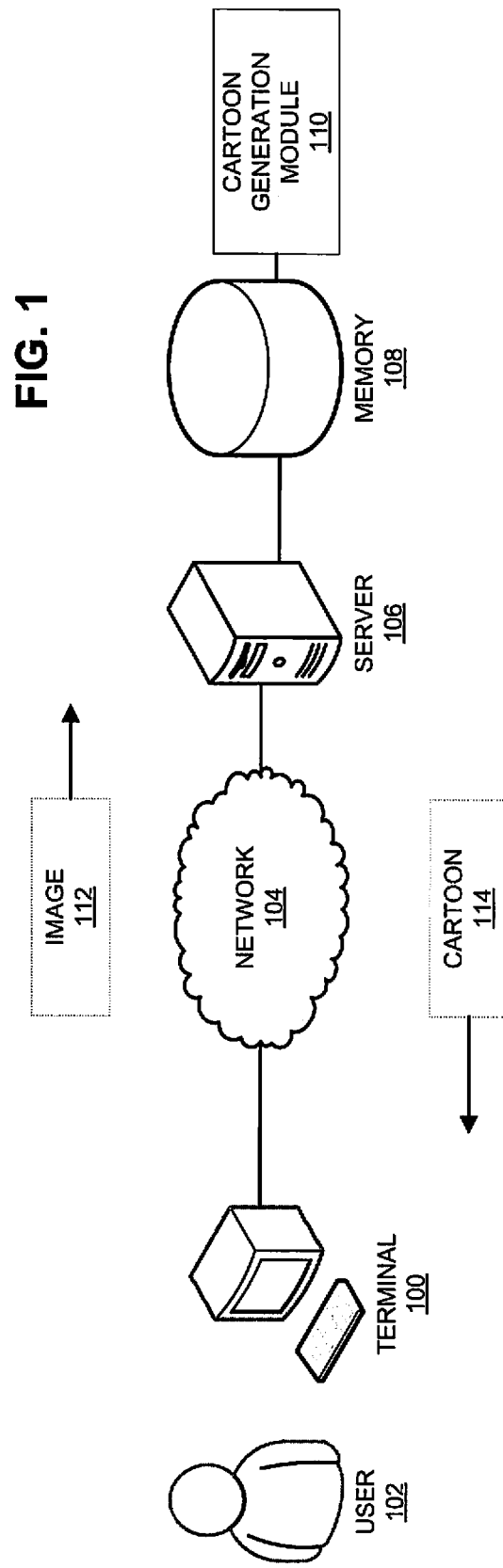

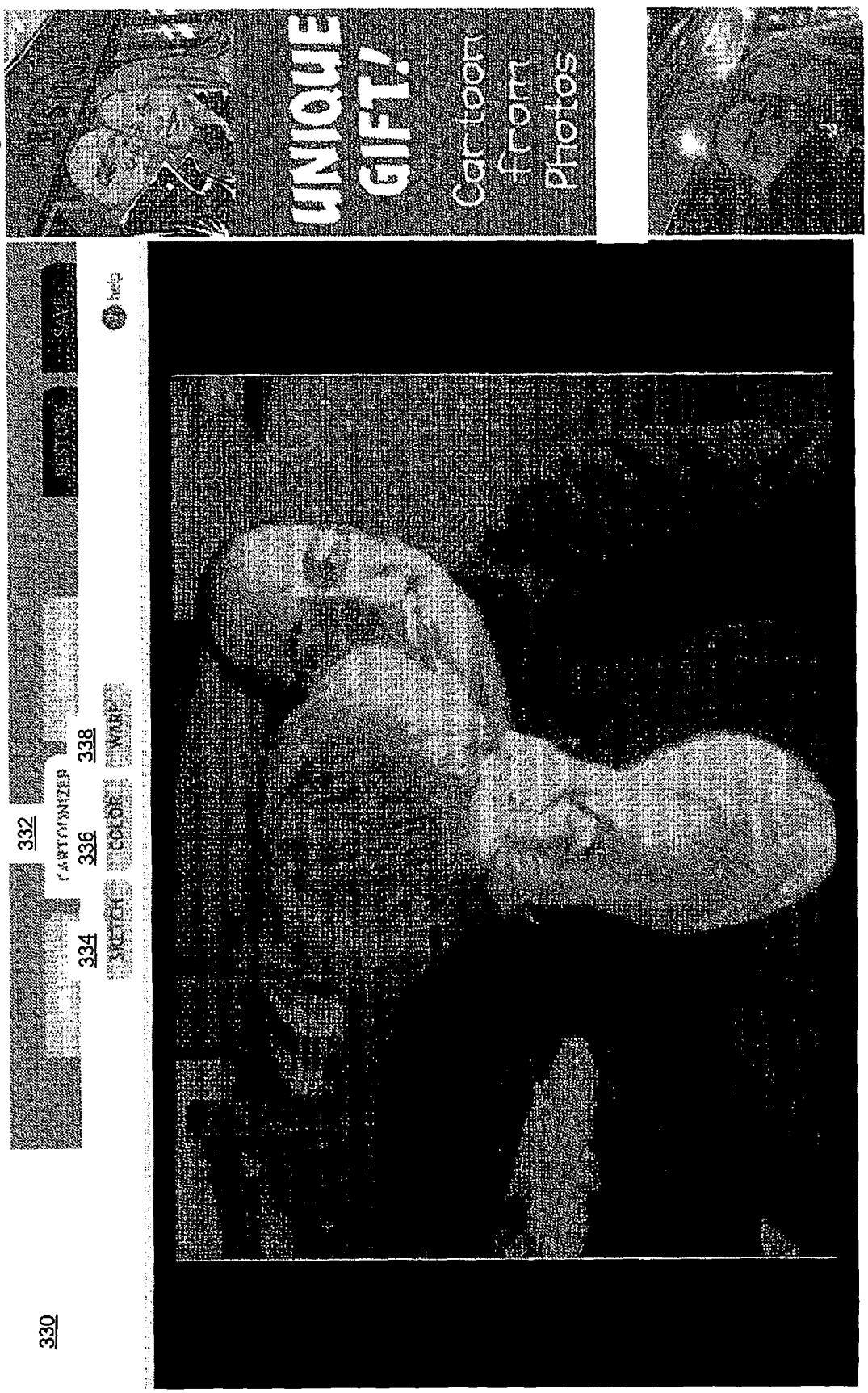

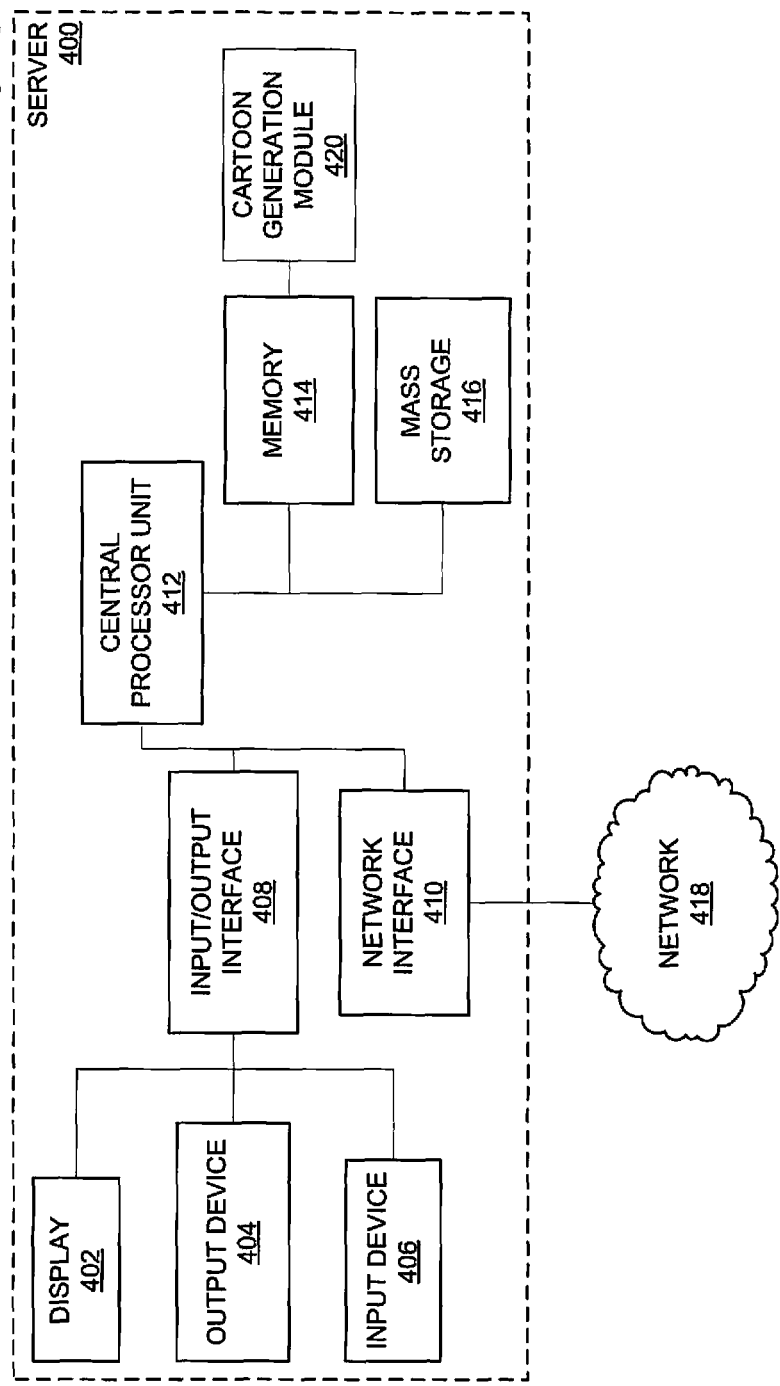

METHOD AND SYSTEM FOR GENERATING ONLINE CARTOON OUTPUTS

CROSS REFERENCE TO RELATED APPLICATIONS

This application claims priority to provisional application No. 61/032,398 entitled "METHOD SYSTEMS AND INTERFACES FOR GENERATING ONLINE CARTOONS IN 2D SCENES" filed on Feb. 28, 2008, and which is incorporated herein by reference.

BACKGROUND

Cartoons are a form of visual art, including drawings or text. Sometimes, a cartoon is a humorous or satirical drawing published in mass media, such as a newspaper or magazine. Cartoons can have specific characteristics, depending on a cartoon style. For example, cartoons can include clearly articulated lines, bold colors or black and white colors, removing color variations, and exaggerated features.

A photograph is an image created by light falling on a light-sensitive surface, usually photographic film or an electronic imager such as a CCD or a CMOS chip. Photographs can be created with a camera, which uses a lens to focus the scene's visible wavelengths of light into a reproduction of what the human eye would see. The process of creating photographs is called photography. Photographs are noted for their realism and life-like details. Digital photographs can be distorted through various techniques, including skewing, coloration change, outlines, and other techniques.

It is sometimes desirable to create cartoons from existing photographs. For example, such cartoons can be used as online avatars, unique art gifts, or in various print and display media.

Existing approaches execute as software at a client. For example, software can be downloaded and installed at a user workstation, where it interacts with the user to retrieve and cartoonize an image. It is desirable to provide a cartoonizer tool to users over a network. This allows a server, which can be very powerful, to execute the processing necessary to cartoonize an image.

In addition, it is desirable to utilize a cartoonization process that produces a more cartoon-like output. Thus, what is needed is an improved cartoonization service easily accessible to users for creating cartoons from user-submitted digital photographs.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description of the Invention, which is to be read in association with the accompanying drawings, wherein:

FIG. 1 illustrates an example system for generating a cartoon.

FIG. 3B illustrates a second example screen shot for generating a cartoon.

FIG. 4 illustrates an example server for generating a cartoon.

DETAILED DESCRIPTION

Figure 2A:
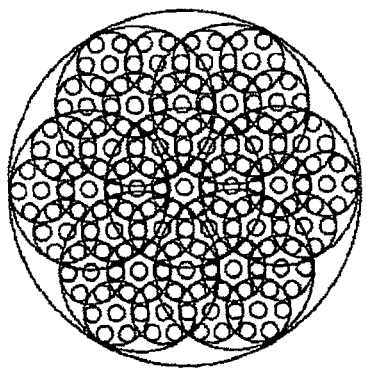
FIG. 2A illustrates an example hexagonal topology.

A method and system for generating cartoon outputs from user-specified inputs is provided. The method produces stable results which closely approximate cartoons. First, a cartoon is defined by a primitive color quantization and a sketch which are merged together to create a new look. The quantization can be obtained using color structure coding (CSC). The sketch can be obtained with one or more edge detection algorithms. Techniques can then be used to combine the two into a final cartoon output.

In one embodiment, the sketch is mainly a black and white portrait which simulates effects of a pen-pencil drawing. The color part of the image is obtained by reforming the image using fewer colors with a suitable (e.g., hexagonal) topology and color islands, e.g. an enhanced color structure coding. To form the cartoon, the sketch and color-quantized image are merged to produce a cartoon.

Another embodiment includes technique based on a hierarchic segmentation and enhanced sketch of a photograph. The user either generates a sketch or generates a cartoon. In certain embodiments, a cartoon is a color reduced and edge emphasized image which resembles a non-detailed appearance of the original image.

In another embodiment, a sketch can be an enhancement on difference of Gaussians. After taking the difference of the convolution of 2 Gaussians, each sketch-like line is considered as a blob and filtered to remove unnecessary details using connected component analysis. The filtered parts are painted on a new domain with white background. This process creates a rough sketch with scar-like details. The enhancement can be done by any suitable algorithm such as Wieckert's coherence enhancing filtering (CED). After the sketch is obtained, the colors can be reduced using suitable techniques such as a common segmentation technique or Color Structure Coding.

Sometimes, pure segmentation is not enough for creating a cartoon effect. The resulting segmented image can be passed through the coherence enhancing diffusion filter again to obtain a smoother image. The last step is to overlay the sketch and the resulting color image together to form the cartoon.

The global image enhancement applied to the whole image refines the colors and details and gives a shiny appearance to the cartoon.

In some embodiments of the user interface, the parameters for sketch generation are fixed so that the user can automatically generate cartoons. In other embodiments, the user can manipulate the threshold between 2 color vectors while forming a color-reduced image.

FIG. 1 illustrates an example system for generating a cartoon. A terminal 100, such as a personal computer or other computing device, is accessible to a user 102. The terminal 100 can execute a web browser or another application to interface with other computing devices.

The terminal 100 communicates with a server 106 over a network 104. The network can be any network configured to carry digital communications, such as the Internet. The server 106 can be a computing device configured to serve one or more terminals, as illustrated in FIG. 4.

The server 106 is in communications with a memory 108. The memory 108 can store computer-readable instructions for providing an interface to generate a cartoon responsive to predefined algorithms and user-provided parameters. The computer-readable instructions can be part of a cartoon generation module 110, discussed below.

It will be appreciated that cartoon generation functionality can be split between the server 106 and the terminal 100. For example, simple pre-processing of the image, such as cropping or color correction, can occur at the terminal 100. More intensive processing can occur at the server 106.

In FIG. 1, in operation, the user 102 submits an image 112 to the server 106 for processing into a cartoon. The server 106 executes the module 110, which processes the image 112. A resulting cartoon 114 is provided back to the user 102. It will be appreciated that no physical transmission of the image 112 or cartoon 114 is necessary. For example, URL addresses can be provided, allowing the terminal 100 and the server 106 to retrieve relevant files from locations accessible over the network 104.

Edgeless Color Image Production

Color structure coding (CSC) is a technique for quantization. It is robust against noise and capable of high performance. CSC uses hierarchical tree data structure to represent the hexagonal topology. In one embodiment, it can be interpreted as a hierarchical region-growing technique.

Hexagonal Topology

FIG. 2A illustrates an example hexagonal topology. The smallest circles denote pixels and each 7 pixels are grouped together to form a 0th Island Level. Seven 0 Level Islands are grouped together to form 1st Island Level. This is repeated until the entire image is grouped into an Island Level N, where N is the last island level. This process is the "linking phase."

Applying this structure to an orthogonal bitmap requires special consideration. Because this topology cannot represent orthogonality, the y axis of the hexagonal lattice is scaled and each second row is shifted by a half unit to left. This alters the shapes of the islands. This new representation is consistent with the hexagonal topology and the distorted islands can be directly used in orthogonal lattice.

The intersection of a level N island with another level N island always includes a level N−1 Island. In this embodiment, the smallest island is referred as a pixel.

Segmentation

In the segmentation phase, similar colored pixels within an island are grouped into code elements. In one embodiment, similarity is defined by a binary threshold mapping. If a Euclidian distance between two colors is smaller than a specified threshold, the colors are said to be similar. Increasing the threshold value leads to more quantization in segmentation. Alternatively, other color metrics could be defined.

Artistic Considerations

An important consideration in evaluating a cartoonization algorithm is the appearance of any output to regular users. Criterion used to evaluate a cartoonization algorithm can include:

1) Color-illumination Duality: A color in the image is affected by mainly two factors: the color value and the illumination value. The color should be kept as close to original as possible. Shadows and highlights are effects of illumination. However, for the human eye, illumination creates a tone difference in color. For this reason, illumination contributes in the coloring phase in terms of tone.

2) Color Quantization: The colors are quantized to represent the original colors as much as possible. Thus, a dominant color in the quantized region is accepted as the color of the image. Averaging techniques can also be used in techniques like K-means, vector quantization or mean shift segmentation. But the human eye sees globally, so global features of resulting image should be weighted more heavily than small local regions.

3) Smoothing: A cartoon further includes smoothing the resulting image quantization. A quantization looks very weak and anti-user friendly. Further, style consistency requires the colors to have smooth boundaries. Thus, what is required is boundary smoothing while preserving the color edges. This phase can also be called cartoon style color enhancement, further discussed below.

Generation of Sketch

Edge detectors like Canny or Sobel are very weak for portrait generation. These edge detectors produce too many edges along with false edges, resulting in a poor sketch. Difference of Gaussians is found to be much more robust against noise, because it involves a smoothing operation. In addition, it is a more natural edge detector in relation to human vision.

$$G_\sigma = \frac{1}{\sqrt{2\pi}\sigma} e^{-\frac{1}{2}\left(\frac{x^2+y^2}{\sigma^2}\right)}$$

The Difference of Gaussians over an image can be defined as:

$$R = G_{\sigma_1} * I - G_{\sigma_2} * I$$

where * is the convolution operator and I is the input image. G and R are also functions of a mask size. The filter with a bigger mask size also has a bigger sigma value. This is automatically determined according to the following Gaussian kernel size table:

| Mask Size | Sigma |
| --- | --- |
| 3 | 0.65 |
| 5 | 0.87 |
| 7 | 1.43 |
| 9 | 1.88 |
| 11 | 2.31 |

The Gaussian function is used after generalizing to RGB image. The resulting image is still noisy because the difference operator is not capable of noise removal. Because small pixel groups are interpreted as noise or unsuccessfully detected edges, the next operation is a filter on small particles. In one embodiment, connectivity and blob filtering can be used. Areas less than a dynamically determined area lower bound are filtered and ignored during processing. This produces rough sketch as output.

Figure 2B:
FIG. 2B illustrates an example Difference of Gaussian sketch and a blob filtered sketch.

FIG. 2B illustrates an example Difference of Gaussian (threshold) sketch (left) and a blob filtered sketch (right).

Enhancement of Sketch

The sketch obtained by Difference of Gaussians is rough, non-smooth and noisy. To produce an artistically beautiful sketch, edges should remain because the human eye perceives edges better than any other feature. Coherence enhancing diffusion gives good artistic results for edge diffusion. The main reason is that it connects and diffuses certain close edges. This enhances the edges in the direction of the maximum coherence. Optimized rotation invariance kernels can be applied for further noise reduction.

Coherence Enhancing Diffusion

Coherence Enhancing Diffusion filtering (CED) is a diffusion algorithm that enhances flow-like structures. Such structures are present everywhere in nature, from landmarks to portraits. A diffusion tensor (the description of how to enhance the coherent structures) is constructed which has the same eigenvectors as the structure tensor (the description of coherent structures). The structure tensor is defined as:

$$J_p(\nabla u_\sigma) = G_p * (\nabla u_\sigma \nabla u_\sigma^T)$$

J is a symmetric, positive semi-definite matrix with eigenvalues:

$$\mu_{1,2} = j_{11} + j_{22} \pm \sqrt{(j_{11} - j_{22})^2 + 4j_{12}^2}$$

D, the diffusion tensor, has properties of symmetry, smoothness and uniform positive definiteness in such form:

$$D = \begin{pmatrix} a & b \\ b & c \end{pmatrix}$$

Its eigenvalues are as follows:

$$\lambda_1 = \begin{cases} \alpha, & \text{if } j_{11} = j_{22} \text{ and } j_{12} = 0 \\ \alpha + (1-\alpha)e^{\frac{-1}{(j_{11}-j_{22})^2 + 4j_{12}^2}}, & x \geq 0 \end{cases}$$

Thus, the final evolution equation becomes:

$$\frac{\partial u}{\partial t} = \nabla \cdot (D \nabla u)$$

Optimized Rotation Invariance (ORI)

Because filters like CED are strongly directed anisotropic processes, the numerical stability of edge direction has crucial importance. They require highly accurate directional behavior. To fulfill this requirement, certain derivative operators are introduced. These operators are simply defined as (in stencil notation):

$$F_z = \begin{bmatrix} -3 & 0 & 3 \\ -10 & 0 & 10 \\ -3 & 0 & 3 \end{bmatrix} \text{ and } F_y = \begin{bmatrix} 3 & 10 & 3 \\ 0 & 0 & 0 \\ -3 & -10 & -3 \end{bmatrix}$$

This modifies the construction of the structure tensor. The tensor is computed by convolutions with optimized rotation invariance kernels. ORI kernels have a very positive impact on numerical stability, providing a faster convergence during computation. This well conditioned behavior results in an inherent advantage in noise reduction.

Further Enhancements

Even though ORI kernels enhance the solution process of the differential equation, the results are not visually satisfying. Further reduction of noise and emphasizing is required. A modified sharpening technique is performed, discussed below.

The edges and corners are contained in the high frequency areas of the image. Because sketch is an edge based representation of the image, sharpening the edges will further reduce noise.

First, the image is low-pass filtered with a mean filter. An output image is computed from the filtered image and the original image with a sharpen factor. The process can be summarized as:

$$R = (\text{round}((1 - (I(*)K)) * \text{Factor})) + I$$

Where (*) is the convolution operator and * is multiplication. K represents an arithmetic mean kernel. Factor is a measurement of contrast.

Figure 2C:
FIG. 2C illustrates a first example final sketch.

FIG. 2C illustrates a first example final sketch.

Figure 2D:
FIG. 2D illustrates a second example final sketch.

FIG. 2D illustrates a second example final sketch.

Content Blending

A next step is to combine the above results. The edge information causes the eye to perceive 3D, which is required to preserve the image content. The segmentation algorithm reduces the amount of colors in a visually desired manner. A trivial approach would be to add the two resulting images together. However, a linear add operation produces a suboptimal result because the rendering styles of images are dissimilar. The two images are rendered with different techniques. Thus, a blending technique must address the technical difference creating the visual incoherence.

In one embodiment, the rough edges are extracted from the image. The enhancement phase is a diffusion operation that applies a specific style. At the same time, segmentation is applied to a Gaussian smoothed version of the original image. Because the segmentation is applied to information already included, it functions as low-pass filtering. The only remaining dissimilarity is coherence enhancing filter. If CED is correctly applied to the color segmentation result, the outputs would be very similar in style. Thus, a naive blend operation would produce the final result.

It is common to decompose a color image into its channels, process the channels separately, and compose the channels back into an image. In contrast, it is mathematically not correct to apply CED on separate channels because the channels are independent vectors. A common diffusion tensor (hence diffusion direction) should be computed for all channels. One way to form a common space is to extract the Y component of YUV color domain. This is a straightforward transformation with almost no computational cost. The Y component is treated as the gray scale mapping of the color image. Diffusion tensor is computed on Y and R, G, B channels, which are evolved separately, with the same diffusion tensor, to the correct solution. This produces better visual results with fewer artifacts.

After applying CED on the segmented image, the sketch is simply multiplied with this image to produce the final output. The resulting image has a smooth nature with diffused edges and reduced amount of colors.

Figure 2E:
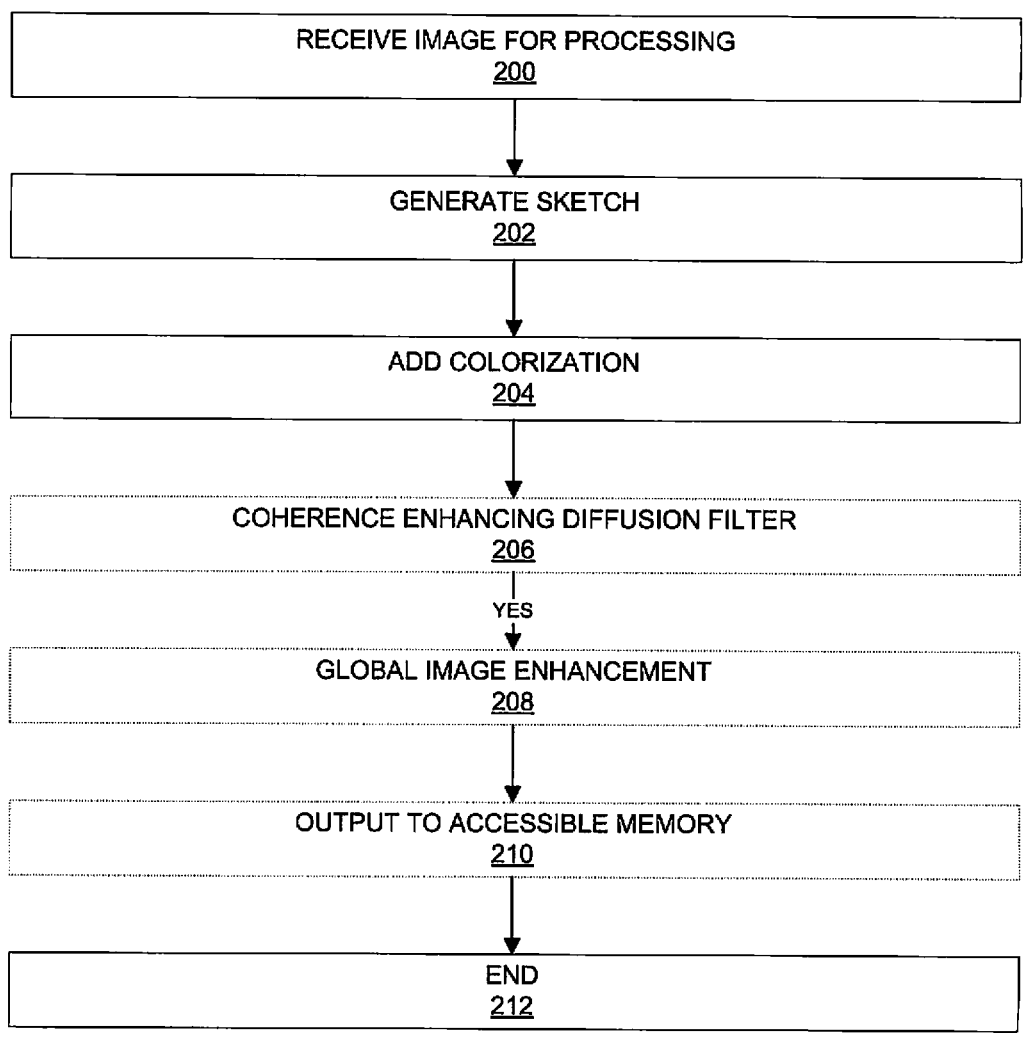
FIG. 2E illustrates an example procedure for receiving user profile information.

FIG. 2E illustrates an example procedure for receiving user profile information. The procedure can execute on a server, as illustrated in FIG. 4, responsive to user commands received over a network.

In 200, the server can receive an image for processing. As discussed below, the server can receive an image from a user upload, a user-specified URL, or from some other location. In one example, the server provides a set of stock images which can be modified by users.

In 202, the server can generate a sketch of the image. As discussed above, the sketch of the image can be generated with a Difference of Gaussian technique, or other techniques.

In 204, the server can generate colorization of the image. As discussed above, the colorization can be obtained through color structure coding, or other techniques.

It will be appreciated that 202 and 204 can be executed in any order or simultaneously.

In 206, the server can optionally process the image with coherence enhancing diffusion filter. As discussed above, this step enhances the sketch obtained from 202.

In 208, the server can optionally process the image with global image enhancement. As discussed above, various enhancement algorithms can be used to enhance the processed image.

In 210, the server can optionally output the processed image to an accessible memory. For example, the processed image can be stored in server-accessible non-volatile memory, a network drive, or another storage device.

In 212, the server can exit the procedure.

Figure 3A:
FIG. 3A illustrates a first example screen shot for generating a cartoon.

FIG. 3A illustrates a first example screen shot 300 for generating a cartoon. A user interface can be made available via a website, as discussed above. A user can access the user interface from a terminal executing a web browser. The user interface can allow a user to provide an image for processing.

The screen shot 300 can include an upload tab 302. The upload tab 302 can provide functionality related to uploading an image or digital photo for processing.

The screen shot 300 can include a cartoonizer tab 304. The cartoonizer tab 304 can provide functionality related to converting the image into a cartoon, as discussed elsewhere.

The screen shot 300 can include an extra tab 306. The extra tab 306 can include extra functionality not belonging in either the upload tab 302 or the cartoonizer tab 304.

The screen shot 300 can include a restore button 308. The restore button 308 can roll back all user changes to an image. For example, user changes can be made via functionality provided with the cartoonizer tab 304. In an alternative embodiment, the restore button 308 can undo a last user change to the image.

The screen shot 300 can include a save button 310. The save button 310 can save all user changes to an image. In one embodiment, the image can be saved on the server and a Uniform Resource Locator (URL) address pointing to the image provided to the user. In another embodiment, the image can be saved to a user-specified location.

The screen shot 300 can include an advertisement 312. For example, the advertisement 312 can relate to products and services relevant to the image processing. Example products and services include hardcopy photographs and merchandise printed or otherwise illustrated with the processed image.

The buttons below can provide functionality associated with uploading an image for processing.

The screen shot 300 can include an upload button 314. The upload button 314 can allow a user to select a local image from the user's terminal for upload to the server.

The screen shot 300 can include a snapshot via webcam button 318. The snapshot button 318 can allow a user to provide an image taken with a locally available webcam or other photo-taking device, such as a digital camera.

The screen shot 300 can include an upload from URL button 320. The URL button 320 can allow a user to provide an URL address pointing to an image. The server the retrieves the image for processing.

The screen shot 300 can include a crop button 320. The crop button 320 can trigger an interface allow the user to crop an uploaded photograph. For example, unnecessary background can be removed. The photograph can be cropped to reduce size and processing time.

The screen shot 300 can include a help button 322. The help button 322 can provide a help interface describing functionality associated with each tab and button in the screen shot 300.

The screen shot 300 can include the uploaded image 324. After the user has uploaded an image, the uploaded image 324 can be displayed for user review. The user can, for example, crop the image and save the image, as discussed above.

FIG. 3B illustrates a second example screen shot 330 for generating a cartoon. The screen shot 330 can be similar to the screen shot of FIG. 3A, but depicting functionality associated with the cartoonizer.

The screen shot 330 can include a selected cartoonizer tab 332. As discussed above, the cartoonizer tab 332 can provide the user with functionality associated with processing the image.

The buttons below can provide functionality associated with processing an uploaded image.

The screen shot 330 can include a sketch button 334. The sketch button 334 can provide functionality associated with a sketch function, as illustrated later. Sketch functionality can include receiving user-specified parameters and processing the image in accordance with predefined algorithms utilizing the received parameters, as discussed.

The screen shot 330 can include a color button 336. The color button 336 can provide functionality associated with a colorization function, as illustrated later. Colorization functionality can include receiving user-specified parameters and processing the image in accordance with predefined algorithms utilizing the received parameters, as discussed.

The screen shot 330 can include a warp button 338. The warp button 338 can provide functionality associated with a warping function, as illustrated later. Warping functionality can include receiving user-specified parameters and processing the image in accordance with predefined algorithms utilizing the received parameters, as discussed.

It will be appreciated that other functionality can be associated with processing the image, as discussed elsewhere. Additional tabs can be provided in the user interface, and each tab can be associated with additional buttons to support an additional functionality.

Figure 3C:
FIG. 3C illustrates a third example screen shot for generating a cartoon.

FIG. 3C illustrates a third example screen shot 340 for generating a cartoon. The screen shot 340 can be similar to the screen shot of FIG. 3B, but depicting functionality associated with the sketch button.

Once the sketch button has been selected, the user interface provides the screen shot 340 to receive user-specified parameters for the sketch function.

The screen shot 340 can include sketch detail radio buttons 342. The user can specify a level of detail to be produced in the sketch, such as "low", "medium", or "high". It will be appreciated that alternative input fields can be used, such as a text field, a slider, or other input field.

The screen shot 340 can include a brightness slider 344. The user can specify a level of brightness to be produced in the sketch. As above, alternative input fields can be used.

The screen shot 340 can include an apply button 346. Once the user has specified the required parameters and any optional parameters, the user clicks the apply button 346. The server then processes the image in accordance with the user-specified parameters.

It will be appreciated that other parameters can be associated with processing the image into a sketch, as discussed. Additional input fields can receive parameters from the user to provide greater user control over the sketch function.

Figure 3D:
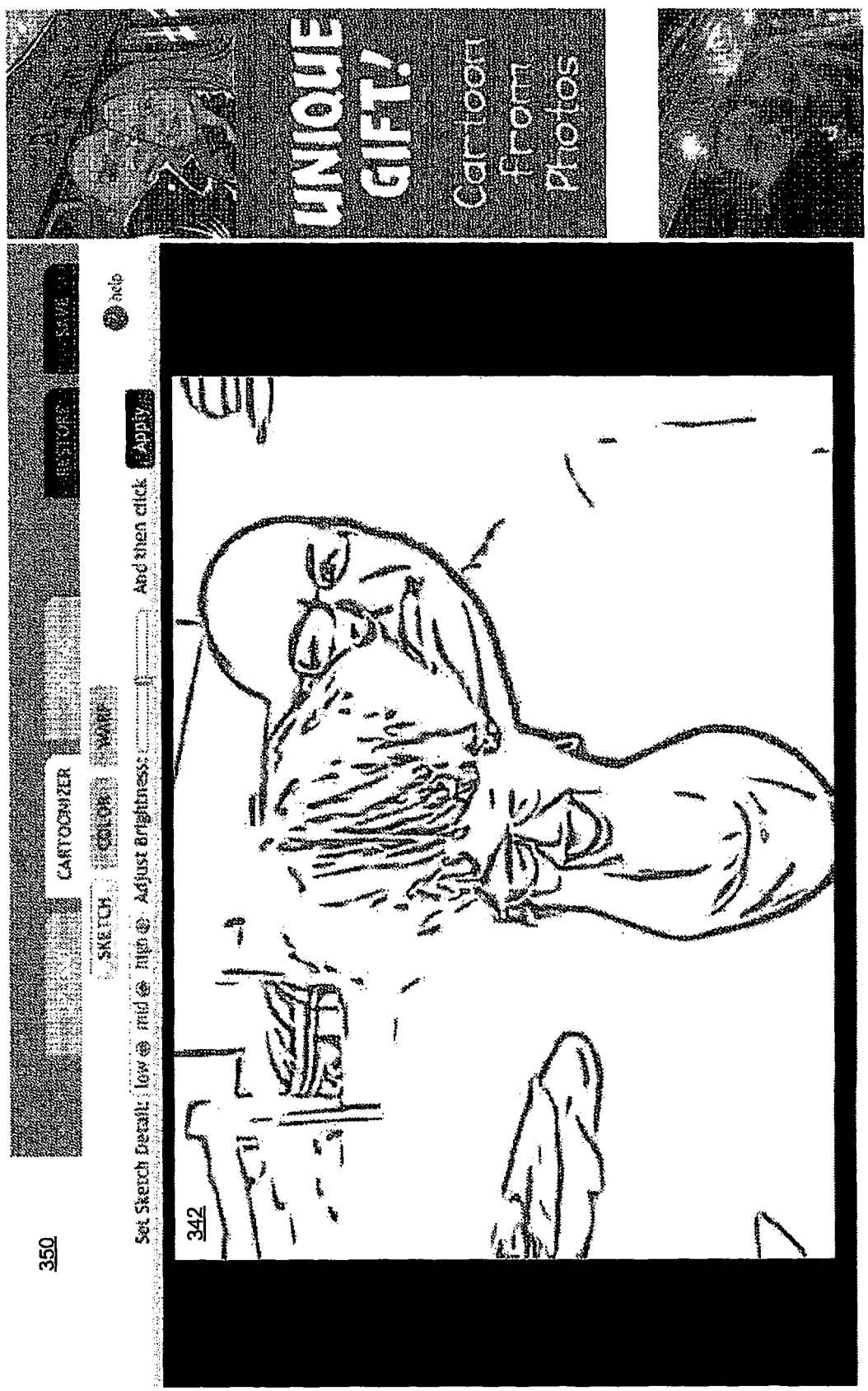
FIG. 3D illustrates a fourth example screen shot for generating a cartoon.

FIG. 3D illustrates a fourth example screen shot 350 for generating a cartoon. The screen shot 350 can be similar to the screen shot of FIG. 3C, but depicting a processed image 342. The image can be processed into a sketch in accordance with user-specified parameters, discussed above.

Figure 3E:
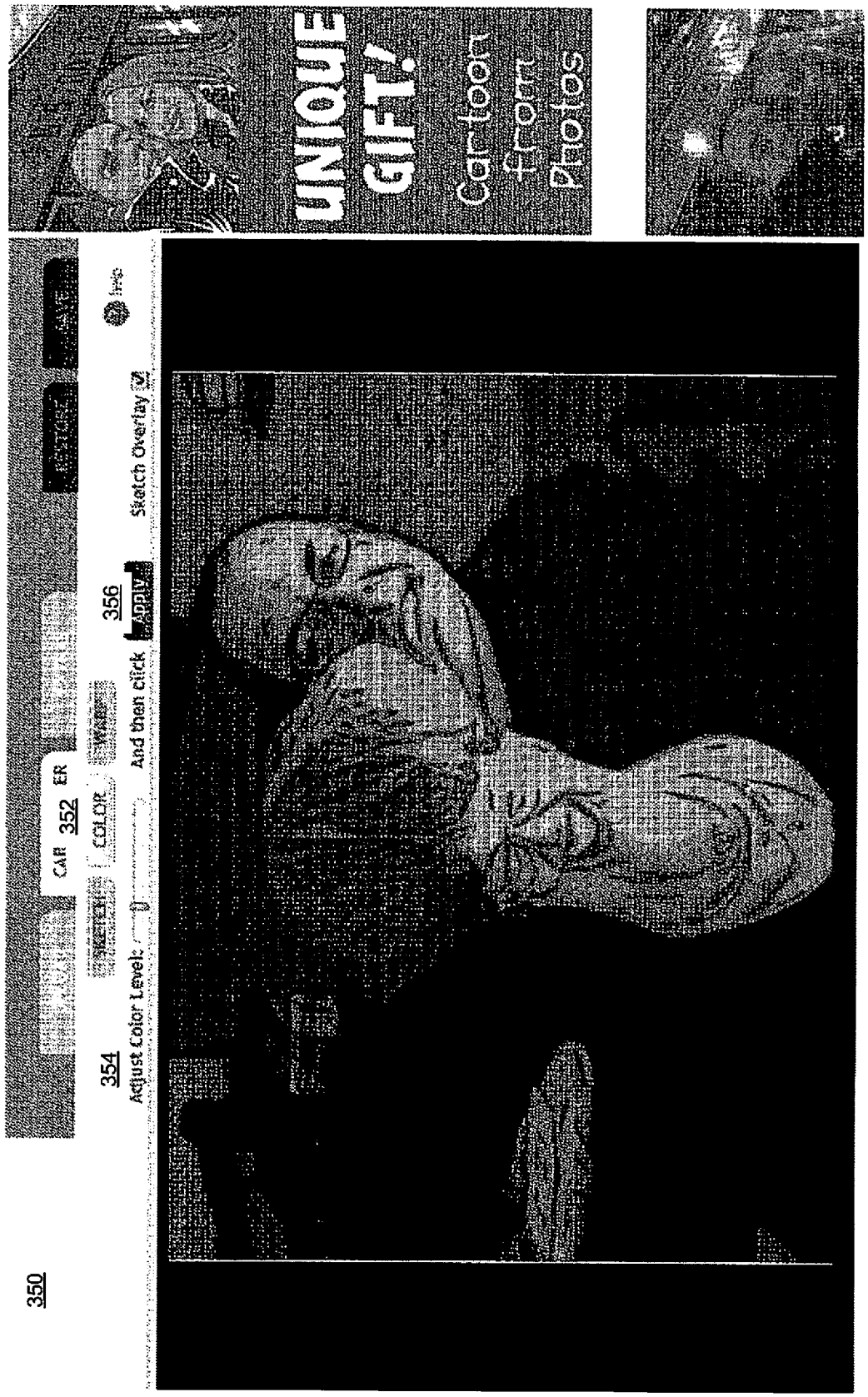
FIG. 3E illustrates a fifth example screen shot for generating a cartoon.

FIG. 3E illustrates a fifth example screen shot 350 for generating a cartoon. The screen shot 350 can be similar to FIG. 3B, except the color button 352 has been selected instead of the sketch button. The screen shot 350 includes parameters for colorization functionality.

The screen shot 350 can include a color level slider bar 354. The color level slider 354 allows the user to specify a color level, as discussed.

The screen shot 350 can include an apply button 356. Once the user has specified the required parameters and any optional parameters, the user clicks the apply button 356. The server then processes the image in accordance with the user-specified parameters.

Figure 3F:
FIG. 3F illustrates a sixth example screen shot for generating a cartoon.

FIG. 3F illustrates a sixth example screen shot 360 for generating a cartoon. The screen shot 360 can be similar to the screen shot of FIG. 3E, but depicting a processed image 362. The image can be processed by a colorization function in accordance with user-specified parameters, discussed above.

FIG. 4 illustrates an example server for generating a cartoon. The server can provide a cartoonizer service to users over a network. In an alternative embodiment, the server can be any computing device in communication with a network.

The server 400 includes a display 402. The display 402 can be equipment that displays viewable images, graphics, text, and other output generated by the server 400 to a server administrator. For example, the display 402 can be a cathode ray tube or a flat panel display such as a TFT LCD. The display 402 includes a display surface, circuitry to generate a viewable picture from electronic signals sent by the server 400, and an enclosure or case. The display 402 can interface with an input/output interface 408, which converts data from a central processor unit 412 to a format compatible with the display 402.

The server 400 includes one or more additional output devices 404. The output device 404 can be any hardware used to communicate outputs to the administrator. For example, the output device 404 can include audio speakers and printers or other devices for providing output.

The server 400 includes one or more input devices 406. The input device 406 can be any hardware used to receive inputs from the administrator. The input device 406 can include keyboards, mouse pointer devices, microphones, scanners, video and digital cameras, etc.

The server 400 includes an input/output interface 408. The input/output interface 408 can include logic and physical ports used to connect and control peripheral devices, such as output devices 404 and input devices 406. For example, the input/output interface 408 can allow input and output devices 404 and 406 to communicate with the server 400.

The server 400 includes a network interface 410. The network interface 410 includes logic and physical ports used to connect to one or more networks. For example, the network interface 410 can accept a physical network connection and interface between the network and the workstation by translating communications between the two. Example networks can include Ethernet, the Internet, or other physical network infrastructure. Alternatively, the network interface 410 can be configured to interface with a wireless network. Alternatively, the server 400 can include multiple network interfaces for interfacing with multiple networks.

As illustrated, the network interface 410 communicates over a network 418. Alternatively, the network interface 410 can communicate over a wired network. It will be appreciated that the server 400 can communicate over any combination of wired, wireless, or other networks.

The server 400 includes a central processing unit (CPU) 412. The CPU 412 can be an integrated circuit configured for mass-production and suited for a variety of computing applications. The CPU 412 can sit on a motherboard within the server 400 and control other workstation components. The CPU 412 can communicate with the other components via a bus, a physical interchange, or other communication channel.

The server 400 includes memory 414. The memory 414 can include volatile and non-volatile storage memory accessible to the CPU 412. The memory can be random access and provide fast access for graphics-related or other calculations. In an alternative embodiment, the CPU 412 can include on-board cache memory for faster performance.

The server 400 includes mass storage 416. The mass storage 416 can be volatile or non-volatile storage configured to store large amounts of data. The mass storage 416 can be accessible to the CPU 412 via a bus, a physical interchange, or other communication channel. For example, the mass storage 416 can be a hard drive, a RAID array, flash memory, CD-ROMs, DVDs, HD-DVD or Blu-Ray mediums.

The server 400 communicates with a network 418 via the network interface 410. The network 418 can be as discussed above in FIG. 1. The server 400 can communicate with a mobile device over the network 418.

The server 400 can execute a cartoon generation module 420 stored in memory 414. The cartoon generation module 420 can process images in accordance with predefined algorithms and user-specified parameters, as discussed above. The processed image can be displayed to the user over the network 418.

It will be appreciated that the above techniques can be applied to digital video and other content. For example, a video file can be retrieved from a digital video camera or other source. The video file depicting a real-life scene can be processed with the techniques discussed above to produce a cartoonized version of the video. The cartoonized video can be used as a unique gift, a marketing tool, or in other applications.

Furthermore, other types of content can be similarly processed. For example, audio files can be processed to increase or decrease specific characteristics. In addition, multiple files can be specified in advance and batch processed in series or parallel.

It will be understood that each block of the flowchart illustrations discussed above, and combinations of blocks in the flowchart illustrations above, can be implemented by computer program instructions. These program instructions may be provided to a processor to produce a machine, such that the instructions, which execute on the processor, create means for implementing the actions specified in the flowchart block or blocks. The computer program instructions may be executed by a processor to cause a series of operational steps to be performed by the processor to produce a computer-implemented process such that the instructions, which execute on the processor, provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

As discussed above, one embodiment of the present invention can be a method for generating a cartoon. The method includes receiving a digital image for processing at a server. The method includes executing a color structure coding procedure to produce a color-reduced interim image. The method includes generating a sketch from the digital image with a Difference of Gaussian procedure. The method includes combining the color-reduced interim image and the sketch into a processed cartoon. The method includes outputting the processed cartoon to an accessible memory. The server can be in communications with a user over a network. The digital image can be received from at least one of: a user upload and a user-specified URL address. The color-reduced interim image can be produced by segmenting sub-images based on a pre-specified threshold. The sketch can be further filtered with connectivity and blob filtering before combination. The sketch can be further filtered by emphasizing high frequency areas before being combination.

Another embodiment of the present invention can be a server for generating a cartoon. The server includes a processor. The processor can be configured to receive a digital image for processing at a server. The processor can be configured to execute a color structure coding procedure to produce a color-reduced interim image. The processor can be configured to generate a sketch from the digital image with a Difference of Gaussian procedure. The processor can be configured to combine the color-reduced interim image and the sketch into a processed cartoon. The processor can be configured to output the processed cartoon to an accessible memory.

The server can be in communications with a user over a network. The digital image can be received from at least one of: a user upload and a user-specified URL address. The color-reduced interim image can be produced by segmenting sub-images based on a pre-specified threshold. The sketch can be further filtered with connectivity and blob filtering before combination. The sketch can be further filtered by emphasizing high frequency areas before being combination.

Another embodiment of the present invention can be a computer-readable storage medium including instructions adapted to execute a method for generating a cartoon. The method includes receiving a digital image for processing at a server. The method includes executing a color structure coding procedure to produce a color-reduced interim image. The method includes generating a sketch from the digital image a Difference of Gaussian procedure. The method includes combining the color-reduced interim image and the sketch into a processed cartoon. The method includes outputting the processed cartoon to an accessible memory. The server can be in communications with a user over a network. The digital image can be received from at least one of: a user upload and a user-specified URL address. The color-reduced interim image can be produced by segmenting sub-images based on a pre-specified threshold. The sketch can be further filtered with connectivity and blob filtering before combination. The sketch can be further filtered by emphasizing high frequency areas before being combination.

The specific embodiments described in this document represent examples or embodiments of the present invention, and are illustrative in nature rather than restrictive. In the above description, for purposes of explanation, numerous specific details are set forth in order to provide a thorough understanding of the invention. It will be apparent, however, to one skilled in the art that the invention can be practiced without these specific details.

Reference in the specification to "one embodiment" or "an embodiment" or "some embodiments" means that a particular feature, structure, or characteristic described in connection with the embodiment is included in at least one embodiment of the present invention. Features and aspects of various embodiments may be integrated into other embodiments, and embodiments illustrated in this document may be implemented without all of the features or aspects illustrated or described. It will be appreciated to those skilled in the art that the preceding examples and embodiments are exemplary and not limiting.

While the system, apparatus and method have been described in terms of what are presently considered to be the most practical and effective embodiments, it is to be understood that the disclosure need not be limited to the disclosed embodiments. It is intended that all permutations, enhancements, equivalents, combinations, and improvements thereto that are apparent to those skilled in the art upon a reading of the specification and a study of the drawings are included within the true spirit and scope of the present invention. The scope of the disclosure should thus be accorded the broadest interpretation so as to encompass all such modifications and similar structures. It is therefore intended that the application includes all such modifications, permutations and equivalents that fall within the true spirit and scope of the present invention.

What is claimed is:

1. A method for generating a cartoon, comprising:
receiving a digital image for processing at a server;
receiving user-specified parameters describing functionality associated with processing the digital image;
producing an edgeless primitive color quantization image utilizing one or more of the user-specified parameters, the producing including:
dividing the entire digital image into a plurality of regions based on a hierarchical overlapping hexagonal topology;
for each specific region of the plurality of regions, selecting a specific color as a function of colors found in the specific region;
for each specific region, applying the selected specific color as a specific color for the specific region, whereby each specific region in the color-reduced image has only a single color;
generating a sketch from the digital image utilizing one or more of the user-specified parameters with a Difference of Gaussian procedure;
applying a coherence enhancing filtering (CED) procedure to enhance the sketch;
applying the CED procedure to enhance the edgeless primitive color quantization image, wherein the CED procedure is applied to all channels of the edgeless primitive color quantization image by computing a common diffusion tensor for all the channels, the computing the common diffusion tensor including
extracting a Y component of YUV color domain of the edgeless primitive color quantization image,
computing the common diffusion tensor on the Y component, and
using the common diffusion tensor to apply the CED procedure on all the channels of the edgeless primitive color quantization image; and
combining the edgeless primitive color quantization image and the sketch into a processed cartoon, wherein the rendering styles of the edgeless primitive color quantization image and the sketch are different and said combining includes multiplying the edgeless primitive color quantization with the sketch.

2. The method of claim 1, further comprising:
outputting the processed cartoon to an accessible memory.

3. The method of claim 1, wherein the server is in communications with a user over a network.

4. The method of claim 3, wherein the digital image is received from at least one of: a user upload or a user-specified URL address.

5. The method of claim 1, wherein the edgeless primitive color quantization image is produced by segmenting sub-images based on a pre-specified threshold.

6. The method of claim 1, wherein the sketch is further filtered with connectivity and blob filtering before combination.

7. The method of claim 6, further comprising:
enhancing the sketch by emphasizing high frequency areas before said combining.

8. The method of claim 1, wherein the selected specific color is a dominant color in the corresponding specific region.

9. The method of claim 1, wherein the selected specific color is selected by applying averaging techniques on the colors found in the corresponding specific region.

10. The method of claim 1, wherein the dividing the entire digital image into the plurality of regions is further based on similarly colored pixels, wherein pixels are similarly colored if a Euclidian distance between the two colors is smaller than a pre-specified threshold.

11. The method of claim 1, wherein for each specific region of the plurality of regions, said selecting the specific color is performed as a function of the colors and illumination found in the specific region.

12. A server for generating a cartoon, comprising:
a processor, the processor configured to:
receive a digital image for processing at a server;
produce an edgeless primitive color quantization image by the steps of: dividing the entire digital image into a plurality of regions based on a hierarchical overlapping hexagonal topology;
for each specific region of the plurality of regions, applying a selected color, derived from colors found in the specific region, as a specific color for the corresponding specific region, whereby each specific region in the color-reduced image has only a single color;
generate a sketch from the digital image with a Difference of Gaussian procedure;
apply a coherence enhancing filtering (CED) procedure to enhance the sketch;
apply the CED procedure to enhance the edgeless primitive color quantization image, wherein the CED procedure is applied to all channels of the edgeless primitive color quantization image by computing a common diffusion tensor for all the channels, the computing the common diffusion tensor including
extracting a Y component of YUV color domain of the edgeless primitive color quantization image,
computing the common diffusion tensor on the Y component, and
using the common diffusion tensor to apply the CED procedure on all the channels of the edgeless primitive color quantization image; and
combine the edgeless primitive color quantization image and the sketch into a processed cartoon, wherein the rendering styles of the edgeless primitive color quantization image and the sketch are different and said combining includes multiplying the edgeless primitive color quantization with the sketch.

13. The server of claim 12, the processor further configured to:
output the processed cartoon to an accessible memory.

14. The server of claim 12, wherein the server is in communications with a user over a network.

15. The server of claim 14, wherein the digital image is received from at least one of: a user upload or a user-specified URL address.

16. The server of claim 12, wherein the edgeless primitive color quantization image is produced by segmenting sub-images based on a pre-specified threshold.

17. The server of claim 12, wherein the processor is further configured to filter the sketch with connectivity and blob filtering before combination.

18. The server of claim 17, wherein the processor is further configured to filter the sketch by emphasizing high frequency areas before being combination.

19. A computer-readable storage medium including instructions adapted to execute a method for generating a cartoon, the method comprising:
establishing a user profile, wherein the user profile includes basic information fields and supplemental information fields;
receiving a digital image for processing at a server;
producing an edgeless primitive color quantization image, the producing including: dividing the entire digital image into a plurality of regions based on a hierarchical overlapping hexagonal topology; for each specific region, applying a region specific selected color to each corresponding specific region of the plurality of regions;
generating a sketch from the digital image with a Difference of Gaussian procedure;
applying a coherence enhancing filtering (CED) procedure to enhance the sketch;
applying the CED procedure to enhance the edgeless primitive color quantization image, wherein the CED procedure is applied to all channels of the edgeless primitive color quantization image by computing a common diffusion tensor for all the channels, the computing the common diffusion tensor including
extracting a Y component of YUV color domain of the edgeless primitive color quantization image,
computing the common diffusion tensor on the Y component, and
using the common diffusion tensor to apply the CED procedure on all the channels of the edgeless primitive color quantization image; and
combining the edgeless primitive color quantization image and the sketch into a processed cartoon, wherein the rendering styles of the edgeless primitive color quantization image and the sketch are different and said combining includes multiplying the edgeless primitive color quantization with the sketch.

20. The medium of claim 19, the method further comprising:
outputting the processed cartoon to an accessible memory.

21. The medium of claim 19, wherein the server is in communications with a user over a network.

22. The medium of claim 21, wherein the digital image is received from at least one of: a user upload or a user-specified URL address.

23. The medium of claim 19, wherein the edgeless primitive color quantization image is produced by segmenting sub-images based on a pre-specified threshold.

24. The medium of claim 19, wherein the sketch is further filtered with connectivity and blob filtering and by emphasizing high frequency areas before combination.

25. A method for generating a cartoon at a server, comprising:
- responsive to receiving a digital image for processing, loading the digital image into accessible memory;
- receiving a set of user-specified parameters via a GUI provided over a network;
- producing an edgeless primitive color quantization image, the producing including: dividing the entire digital image into a plurality of regions based on a hierarchical overlapping hexagonal topology; for each specific region, applying a region specific selected color to each corresponding specific region of the plurality of regions;
- executing a Difference of Gaussian procedure with the set of user-specified parameters to produce a sketch;
- applying a coherence enhancing filtering (CED) procedure to enhance the sketch;
- applying a CED procedure to enhance the edgeless primitive color quantization image, wherein the CED procedure is applied to all channels of the edgeless primitive color quantization image by computing a common diffusion tensor for all the channels, the computing the common diffusion tensor including
  - extracting a Y component of YUV color domain of the edgeless primitive color quantization image,
  - computing the common diffusion tensor on the Y component, and
- using the common diffusion tensor to apply the CED procedure on all the channels of the edgeless primitive color quantization image;
- combining the edgeless primitive color quantization image and the sketch into a processed cartoon, wherein the rendering styles of the edgeless primitive color quantization image and the sketch are different and said combining includes multiplying the edgeless primitive color quantization with the sketch; and
- providing the processed cartoon to the user.

26. A server, comprising:
a processor, the processor configured to:
- receive a digital image for processing at a server;
- receive user-specified parameters describing functionality associated with processing the digital image;
- produce an edgeless primitive color quantization image utilizing one or more of the user-specified parameters by the steps of: dividing the entire digital image into a plurality of regions based on a hierarchical overlapping hexagonal topology; for each specific region of the plurality of regions, applying a selected color, derived from colors found in the specific region, as a specific color for the corresponding specific region;
- generate a sketch from the digital image utilizing one or more of the user-specified parameters with a Difference of Gaussian procedure;
- apply a coherence enhancing filtering (CED) procedure to enhance the sketch;
- apply the CED procedure to enhance the edgeless primitive color quantization image, wherein the CED procedure is applied to all channels of the edgeless primitive color quantization image by computing a common diffusion tensor for all the channels, the computing the common diffusion tensor including
  - extracting a Y component of YUV color domain of the edgeless primitive color quantization image,
  - computing the common diffusion tensor on the Y component, and
  - using the common diffusion tensor to apply the CED procedure on all the channels of the edgeless primitive color quantization image;
- combine the edgeless primitive color quantization image and the sketch into a processed cartoon; and
a display, coupled to the processor, the display configured to display images and at least one output signal generated by the processor, the display's screen including:
- an upload tap, configured to provide functionality of uploading an user selected image to the server,
- a cartoonizer tab, configured to provide functionality of converting the user selected image into a cartoon,
- a restore tab, configured to provide functionality of rolling back all changes to the user selected image, and
- a save tab, configured to provide functionality of saving all changes to the user selected image.

27. The method of claim 26, wherein the region specific selected color is a dominant color in the corresponding specific region.

28. The method of claim 26, wherein the region specific selected color is selected by applying averaging techniques on colors found in the corresponding specific region.

* * * * *